United States Patent
Ould-Brahim

(10) Patent No.: US 7,467,215 B2
(45) Date of Patent: Dec. 16, 2008

(54) SVC-L2.5 VPNS: COMBINING LAYER-3 VPNS TECHNOLOGY WITH SWITCHED MPLS/IP L2VPNS FOR ETHERNET, ATM AND FRAME RELAY CIRCUITS

(75) Inventor: Hamid Ould-Brahim, Kanata (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 795 days.

(21) Appl. No.: 10/657,939

(22) Filed: Sep. 9, 2003

(65) Prior Publication Data

US 2004/0049597 A1    Mar. 11, 2004

Related U.S. Application Data

(60) Provisional application No. 60/409,325, filed on Sep. 9, 2002.

(51) Int. Cl.
G06F 15/16    (2006.01)
G06F 15/173   (2006.01)

(52) U.S. Cl. .............. 709/230; 709/238; 709/239; 709/240; 709/241; 709/242

(58) Field of Classification Search ............ 709/230, 709/238–242
See application file for complete search history.

(56) References Cited

U.S. PATENT DOCUMENTS

| | | | |
|---|---|---|---|
| 6,912,592 B2 * | 6/2005 | Yip | 709/249 |
| 7,099,944 B1 * | 8/2006 | Anschutz et al. | 709/227 |
| 7,103,008 B2 * | 9/2006 | Greenblat et al. | 370/258 |
| 7,127,523 B2 * | 10/2006 | Kotser | 709/238 |
| 7,136,374 B1 * | 11/2006 | Kompella | 370/352 |
| 7,155,518 B2 * | 12/2006 | Forslöw | 709/227 |
| 7,203,762 B2 * | 4/2007 | Yamada et al. | 709/238 |
| 7,266,124 B2 * | 9/2007 | Kim et al. | 370/397 |
| 7,289,436 B2 * | 10/2007 | Schaller et al. | 370/225 |
| 7,315,554 B2 * | 1/2008 | Baum et al. | 370/469 |
| 2003/0026271 A1 * | 2/2003 | Erb et al. | 370/401 |
| 2004/0037296 A1 * | 2/2004 | Kim et al. | 370/395.53 |
| 2005/0163101 A1 * | 7/2005 | Smith et al. | 370/351 |

OTHER PUBLICATIONS

Rosen et al. Mar. 1999. RFC 2547—BGP/MPLS VPNs. http://www.faqs.org/rfcs/rfc2547.html.*

(Continued)

*Primary Examiner*—Bunjob Jaroenchonwanit
*Assistant Examiner*—Hieu T Hoang
(74) *Attorney, Agent, or Firm*—Ridout & Maybee LLP

(57) ABSTRACT

A Layer-2.5 virtual private network arrangement and method is disclosed for switched Layer2VPN combined with a subset of Layer-3 VPNs. The switched virtual circuit Layer-2 VPN includes logical ports of two types, customer and provider, and port information tables, and uses Layer-3 mechanisms to distribute customer routes. This provides simplified provisioning and a degree of customer autonomy regarding establishing of virtual connections without the assistance of the service provider across the service provider's network while allowing the provider to distribute customer reachability information. The switched virtual circuit Layer-2.5 VPN using Layer-3 mechanisms is particularly useful for customers who are not comfortable with a full Layer-3VPN IP datapath due to special security concerns or a desire for Layer-2 QoS with benefits of an IP-VPN service.

23 Claims, 7 Drawing Sheets

OTHER PUBLICATIONS

Rosen, draft-ietf-ppvpn-l2vpn-00; "AnArchitecture for L2VPNs", Internet draft, Jul. 2001, pp. 1-12.

Ould-Brahim, draft-ouldbrahim-bgpgmpls-ovpn-01; "BGP/GMPLS Optical VPNs", Internet draft, Jul. 2001, pp. 1-15.

Martini, draft-ietf-pwe3-control-protocol-03; Internet draft Jun. 2003, pp. 1-26.

Martini, draft-martini-l2circuit-trans-mpls-11; Internet draft Apr. 2003, pp. 1-16.

Andersson, draft-letf-ppvpn-l2-framework-01; Internet draft Aug. 2002, pp. 1-33.

Ould-Brahim, draft-ouldbrahim-ppvpn-gvpn-bgpgmpls-00; Internett draft Apr. 2002, pp. 1-18.

Ould-Brahim; draft-letf-ppvpn-bgpvpn-auto-02; Internet draft Jan. 2002, pp. 1-10.

Berger, draft-ietf-mpls-generalized-signaling-09; Internet draft Jan. 2003, pp. 1-2.

Rosen, draft-ietf-l2vpn-signaling-00; Internet draft Sep. 2003, pp. 1-20.

Awduche; rfc3209; Internet draft Dec. 2001, pp. 1-55.

Bates, multiprotocol-extensions-bgp-4, Internet draft Feb. 1998. pp. 1-3.

* cited by examiner

SVC-L2.5 VPNS: COMBINING LAYER-3 VPNS TECHNOLOGY WITH SWITCHED MPLS/IP L2VPNS FOR ETHERNET, ATM AND FRAME RELAY CIRCUITS

RELATED U.S. APPLICATION DATA

Provisional application No. 60/409,325 filed on Sep. 9, 2002.

FIELD OF THE INVENTION

The present invention relates to a combination of switched Layer-2 Virtual Private Networks (VPNs) with a layer-3 VPN and is particularly concerned with flexible, on-demand switched MPLS/IP Layer-2 VPNs for Ethernet, ATM and Frame Relay SVCs while distributing customer routes through Layer-3 VPN mechanisms.

BACKGROUND OF THE INVENTION

A Virtual Private Network (VPN) may be thought of as a private network constructed within a shared network infrastructure. In common terminology, these private networks are used by clients while the network infrastructure is supplied by providers.

Existing varieties of Layer-3 VPNs have limitations affecting ease of implementation and use generating:

- customers who are not comfortable with Layer-3 VPN IP datapath due to security concerns;
- customers who want to have flexibility to use Layer-2 circuits for some applications integrated into a Layer-3 VPN;
- customers who want to improve their Layer-3 management but want control on the datapath;
- customers who want to use Layer-2 QoS capabilities with IP-VPN service; and
- customers who plan to upgrade to Layer-3 VPN in the future but are not ready to give up their existing Layer-2 networks, for example, Frame Relay networks currently generating revenue.

In view of the foregoing, it would be desirable to provide a technique for providing switched layer-2 VPNs combined with a subset of layer-3 VPN technology which overcomes the above-described inadequacies and shortcomings.

SUMMARY OF THE INVENTION

An object of the present invention is to provide an improved switched virtual circuit Layer-2 virtual private network arrangement combining Layer-3 VPNs technology with switched MPLS/IP L2VPNs for Ethernet, ATM and Frame Relay Circuits.

According to an aspect of the present invention, there is provided a network for providing switched virtual circuit Layer-2 VPNs, wherein the network includes a set of elements interconnected by services; at least one first subset of said elements defining a private network; and at least one second subset of elements different from said first subset defining a provider network wherein at least two subgroups of said first subset of elements may be connected via said provider network. There are a plurality of customer ports maintained on the elements of the first subset of elements and a plurality of provider ports maintained on the second set of elements, each of the plurality of provider ports connected by services to a customer port. At each element of the provider network having a provider port is a port information table containing mapping information relating addresses of customer ports to addresses of provider ports for the first subset of elements. The network also includes a provisioning mechanism used to define element membership in said first subset of elements, a signalling mechanism used to create Layer-2 connectivity between elements within said first subset of elements at the Layer-2 level across said second subset of elements, and a reachability distribution mechanism.

Advantages of the present invention include real-time establishment of customer Layer-2 virtual circuits (VCs), and the ability to perform dynamic client reconfiguration via dynamic routing. Support for traffic engineering within the L2.5VPN service can be rendered without impacting traffic engineering on the provider network. There is support for an arbitrary mesh topology. In terms of mobility, L2.5VPN allows the ability to move one port of an L2.5VPN from one provider edge device (PE) to another and one provider to another without impacting the L2.5VPN and client network addressing. A further advantage is that L2.5 dynamic bandwidth management supports interworking to legacy Layer-2 VPNs.

Conveniently the invention further provides for the reachability distribution mechanism to use a Layer-3 VPN service. This Layer-3 VPN service could be one of piggybacking VPN routes onto the backbone Border Gateway Protocol, or alternatively that of using a virtual router redistribution scheme.

Conveniently the invention further provides for an auto-discovery mechanism for distributing said mapping information to layer-2 port information tables of the provider network. This auto-discovery mechanism for distributing said mapping information uses Border Gateway Protocol in some instances.

In accordance with another aspect of the present invention, there is provided a method of organizing a network having a set of elements interconnected by services, wherein at least one first subset of the elements defines a private network and at least one second subset of elements different from the first subset defines a provider network and wherein at least two subgroups of the first subset of elements may be connected via the provider network, wherein the method includes the steps of defining element membership in said first subset of elements via a provisioning mechanism; establishing a plurality of customer ports within said elements of the first subset of elements; and establishing a plurality of provider ports within the second set of elements. Each of the plurality of provider ports are connected by services to a customer port. Thereafter, the step of establishing a port information table at each element of said provider network having a provider port, the port information table containing mapping information relating addresses of customer ports to addresses of provider ports. The method further includes the steps of determining reachability across said second subset of elements; and creating Layer-2 connectivity within the first subset of elements at the Layer-2 level across the second subset of elements via a signalling mechanism.

The present invention further includes a method of organizing a network having a set of elements interconnected by services, wherein at least one first subset of the elements defines a private network and at least one second subset of elements different from the first subset defines a provider network and wherein at least two subgroups of the first subset of elements may be connected via the provider network. The method includes the steps of defining a L2VPN topology; establishing a plurality of customer ports within said elements of said first subset of elements; and establishing a plurality of provider ports within said second set of elements, each of said plurality of provider ports connected by data and signalling services to a customer port. Thereafter, creating a Layer-2 Port Information Table for each provider port; establishing the identity of customer ports attached to each provider port, and populating the Layer-2 Port Information Table at that provider port with mapping information relating addresses of customer ports to addresses of provider ports. Further steps include distributing said mapping information to Layer-2 Port Information Tables of the provider network via an auto-discovery mechanism; determining reachability across the second subset of elements via a Layer-3 VPN service; and creating Layer-2 connectivity within the first subset of elements at the Layer-2 level across the second subset of elements via a signalling mechanism upon request from an element within the first subset of elements.

The present invention will now be described in more detail with reference to exemplary embodiments thereof as shown in the appended drawings. While the present invention is described below with reference to the preferred embodiments, it should be understood that the present invention is not limited thereto. Those of ordinary skill in the art having access to the teachings herein will recognize additional implementations, modifications, and embodiments which are within the scope of the present invention as disclosed and claimed herein.

BRIEF DESCRIPTION OF THE DRAWINGS

The invention will be further understood from the following detailed description of embodiments of the invention and accompanying drawings in which.

DETAILED DESCRIPTION

Figure 1:
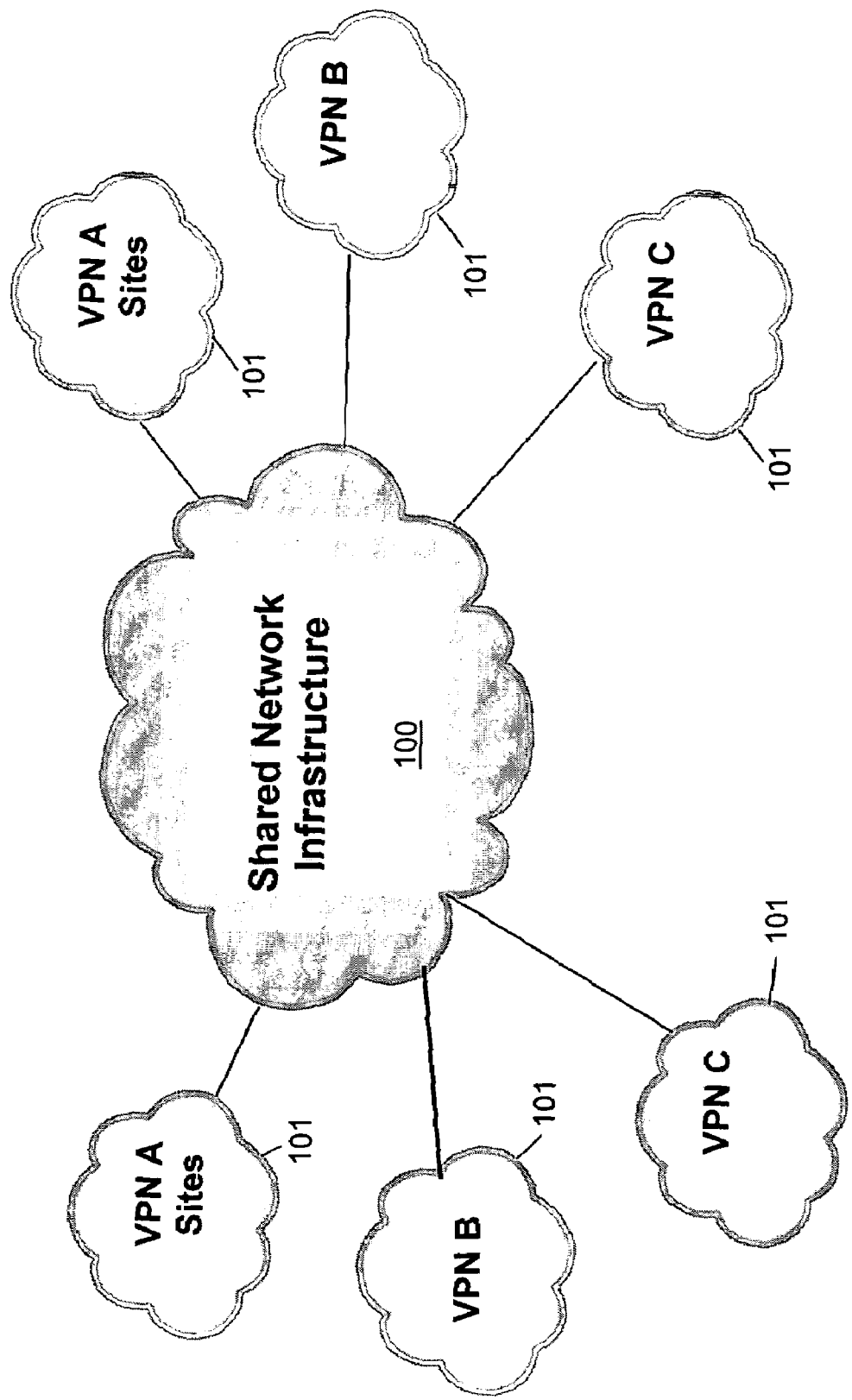
FIG. 1 is a diagram of a generic network having a shared network infrastructure and Virtual Private Networks associated thereto.

Glossary of Acronyms Used
P—Provider Device
PE—Provider Edge Device
CE—Customer Edge Device
SVC—Switched Virtual Circuit
CPI—Customer Port Identifier (Layer-2)
PPI—Provider Port Identifier (Layer-2)
PIT—Port Information Table
L2PIT—Layer-2 Port Information Tabl2
BGP—Border Gateway Protocol
BGP-AD—BGP Auto-Discovery
MPLS—Multi-Protocol Label Switching
DLCI—Data Link Connection Identifier
LMP—Link Management Protocol
ISP—Internet Service Provider
SVC-TE—SVC-L2VPN with Traffic Engineering Capabilities Referring to FIG. 1, there may be seen a generic network having a shared network infrastructure 100 with connected virtual private network sites 101. The VPN sites 101 make use of the network infrastructure 100 to interconnect physically remote sub-networks of particular VPNs.

Figure 2:
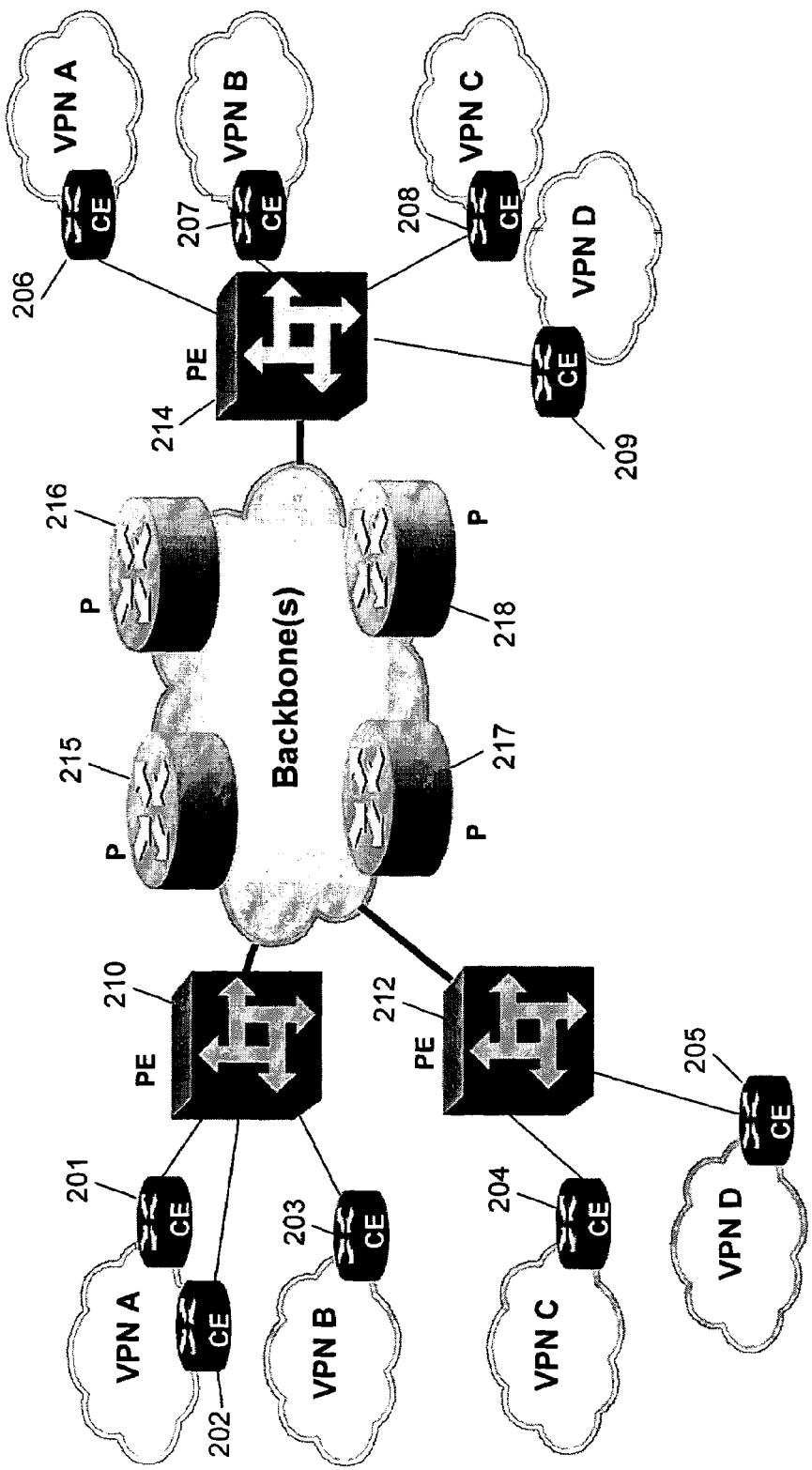
FIG. 2 is a diagram of a network reference model including a plurality of customer edge devices, provider edge devices, and provider devices within the network.

Referring to FIG. 2, there may be seen a network reference model showing a more detailed depiction of a network having a plurality of customer edge router/switches (CEs) 201, 202, 203, 204, 205, 206, 207, 208 and 209. The provider network has provider edge router/Layer-2 switches (PEs) 210, 212, and 214 as well as provider devices (P) 215, 216, 217, and 218 interior to the provider network.

Further in FIG. 2 may be seen the typical case where VPN A has a portion connected to CEs 201 and 202, and another portion connected to CE 206. Communication services between these remote portions of VPN A will be provided by the provider network. The same general situation obtains for VPN B, VPN C, and VPN D.

In operation, the Switched Virtual Connection Layer-2.5 VPN (SVC-L2.5VPN) is a provider-based Layer-2 and Layer-3 VPN service that allows clients to request on-demand Layer-2 circuits while distributing customer routes through Layer-3 mechanisms.

The SVC-L2.5VPN uses the mechanisms for SVC-L2VPN described in U.S. patent application Ser. No. 10/658,701, hereby incorporated by reference, which are characterized by:

a given topology;

using IP/MPLS based signalling between CE-PE (or any other layer-2 signalling protocols);

the possible employment of Link management protocol (LMP) for Layer-2 link-port consistency;

use of private addresses which have the potential to be overlapping with other addresses in other VPNs; and the capacity to be built using single-sided signalling and auto-discovery mechanisms as, for example, being standardized in IETF.

Layer-2.5VPN service combines both advantages of Layer-3 VPNs as described in RFC2547 and "switched" Layer-2 VPNs in that:

it allows the CE to peer with the PE at Layer-3 only i.e. there is no need to peer with all remote CEs;

it allows the CE to use a Layer-2 VPN as the transport mechanism; and it also allows for re-using the advantages of new GMPLS-enabled VPN technology, namely to separate datapath from control, and to perform single-ended provisioning.

A formulaic description would be as follows:

SVC MPLS/IP L2.5VPN=SVC+(G)MPLS+IP+VPN Constructs where:

SVC implements the private switched model;

(G)MPLS provides signalling for Layer-2 connections;

IP is the IP control channel and IP VPN route distribution; and

VPN Constructs are services such as VPN membership, overlapping addresses, VPN auto-discovery, etc.

The key objectives of Layer-2 use in L2.5VPNs includes:

constrained or restricted connectivity as defined by customer, and as maintained and enforced by the service provider;

an on-demand Layer-2 circuit request initiated by the L2.5VPN customer requiring no coordination with the service provider;

the client devices operate within the L2.5VPN space independently from the service provider network operations Subject to the defined constrained or restricted connectivity;

there exists privacy/independence with respect to addressing and routing both among L2.5VPN customers, as well as between an L2.5VPN customer and a service provider;

there is support for single-ended provisioning; and there is support for a multiservice Layer-2 switched model including such services as ATM, Frame Relay, Ethernet, Ethernet VLAN (PPP, HDLC, etc).

The key objectives of Layer-3 use in L2.5VPNs includes:

Layer-3 VPN constructs, specifically distributing reachability using VPN distribution of VPN routes through the backbone BGP (as per RFC2547), or virtual router (VR) distribution of VPN routes; and optional IP services for IP traffic (if a L2.5VPN is provisioned to also provide a layer-3 VPN).

A number of benefits for both client and provider are associated with SVC-L2.5VPNs as compared to legacy Layer-2 VPNs and SVC-L2VPNs.

Advantages to the VPN Customer on the client side are multiple and include:

no peering with private sites (resolving n-square routing peering issue);

peering only with attached PE;

being able to use Layer-2 Circuits even when an L3VPN is offered, thereby taking advantage of legacy and new Layer-2 VPNs;

compatible with access clients that are 'MPLS/IP' signalling based supports overlapping/private address space;

supports Layer-3 addresses within the L2VPN (and does not require transport Layer-2 addresses);

higher mobility in that a customer can move its L2VPN from one port to another without changing the addressing of the L2VPN (in fact without changing the L2VPN addressing, QoS, etc.) thus offering a greater flexibility for network operations;

that the L2VPN addresses can be used for customer Layer-3 network;

offering a range of security capabilities including Layer-2 security;

offering a range of QoS capabilities that includes Layer-2 VPNs QoS (including the legacy L2VPNs);

allowing the SVC-L2VPN circuit to be used as either a legacy Layer-2 circuit or as an MPLS LSP within the client network as needed;

not requiring the client to implement full MPLS but just signalling protocol at the edges; and allowing the option of the client using the SVC-TE services to better optimize his network and perform traffic engineering operations.

Advantages to the Service Provider on the provider side include:

opportunity for new revenue opportunities to the ISPs;

support for Dynamic Membership distribution to ease circuit configuration and distribution;

capable of interworking with existing legacy Layer-2 VPNs;

provides opportunity to maximize yield from network investment on legacy Layer-2 and IP/MPLS based infrastructure;

leverages existing provider skill level in Layer-2 VPNs;

avoids requirement for tunnelling (including MPLS) between PE-PE (only when MPLS is used in the core);

support for reusing (G)MPLS for link, port constructs;

support for single-sided signalling;

allows Provider network operations to be completely decoupled from the customer L2VPNs unlike the case for legacy switched L2VPNs; and provides better scaling than Layer-3 VPNs or Layer-3 VPNs with extended two-phase discovery mechanisms.

Dependent upon the implementation and service offering, an L2.5VPN service can offer:

a L2.5VPN service with options to offer an Layer-3 VPN service (in addition to L2.5) on the same port if needed.

to use an Layer-2 VPN service (in addition to L2.5) consisting of:
  traditional legacy L2VPN;
  new MPLS/IP L2VPN (PVC models);
  new MPLS/IP Switched L2VPN;
  new SVC-TE (L2VPN with traffic engineering capabilities);

to exclusively operate a L2.5VPN service but with Layer-3 reachability distribution, and Layer-2 datapath; and a L2.5VPN service with traffic engineering (TE) capabilities.

The Layer-3 advantages of a L2.5VPN service include:

IP access between PE and CE at control plane;

the CEs do not establish routing peering between themselves;

the PE devices manage customer routes for distribution only;

the service provider (SP) network provides automatic inter-site connectivity among customer CE devices;

the SP guarantees security and isolation of the VPNs between themselves and between the service provider's network(s) using a variety of options including that of legacy L2VPNs; and the SP may offer per VPN basis extranet and internet access with an L2.5VPN.

The SVC-L2.5VPN protocol requirements are as follows:

at the CE:
  require support for MPLS signalling, for example RSVP-TE with SVC-L2VPN extensions but not necessarily MPLS forwarding;
  require an IP-based control channel, for example, IP tunnelling; and
  require support for routing-protocol or static routes between CE-PE within the VPN context.

at the PE:
  require an IP based control channel;
  require MPLS signalling; and
  optionally an auto-discovery mechanism; and
  require a mechanism for distributing reachability The SVC-L2.5VPN Architecture Components may be summarized as follows:

Access is Layer-2 or Layer-3 VPNs;

Require an IP-based control channel for learning customer routes and signalling adjacency Layer-2.5 VPN reachability distribution using a Layer-3 VPN service for distributing reachability, such as piggybacking VPN routes onto the backbone BGP as described in RFC2547, or by using a Virtual Router (VR) distribution scheme;

a generalized L2.5 discovery mechanism using Layer-3 discovery for the Layer-3 routes, and Layer-2 discovery for the Layer-2 port information;

Membership is defined in the same way as existing Layer-2 VPNs and Layer-3 VPNs;

switched on-demand SVC-L2VPNs;

forward adjacency with L2.5VPNs;

Ports and links are logical constructs that uses (G)MPLS functions; and

Signalling is MPLS based (packet side only) between CE-PE.

The SVC-L2.5VPN Building Blocks may be summarized as follows:

Customer and Provider Ports;

A Layer-2 Port Information Table (L2PIT) which maintains mapping between customer ports and provider ports (at the edges of the service provider network) provides local CEs with the information about other ports in the SVC-L2.5VPN, and is defined on a per SVC-L2.5VPN basis or for all the SVC-L23VPNs connected to PE;

a Layer-2 BGP based auto-discovery mechanism (BGP-AD) used to determine and distribute information related to customer and provider ports to the PEs, and to populate the L2PIT with this information;

a (G)MPLS-signalling mechanism to create connectivity within the set of client devices that are part of the same VPN at the Layer-2 level; and a reachability distribution mechanism which may be VPN distribution of VPN routes through the backbone BGP, or virtual router (VR) distribution of VPN routes.

Customer site reachability may be determined either by:

use of static routes; or use of standard routing protocols such as RIP, OSPF, or IBGP.

Figure 3:
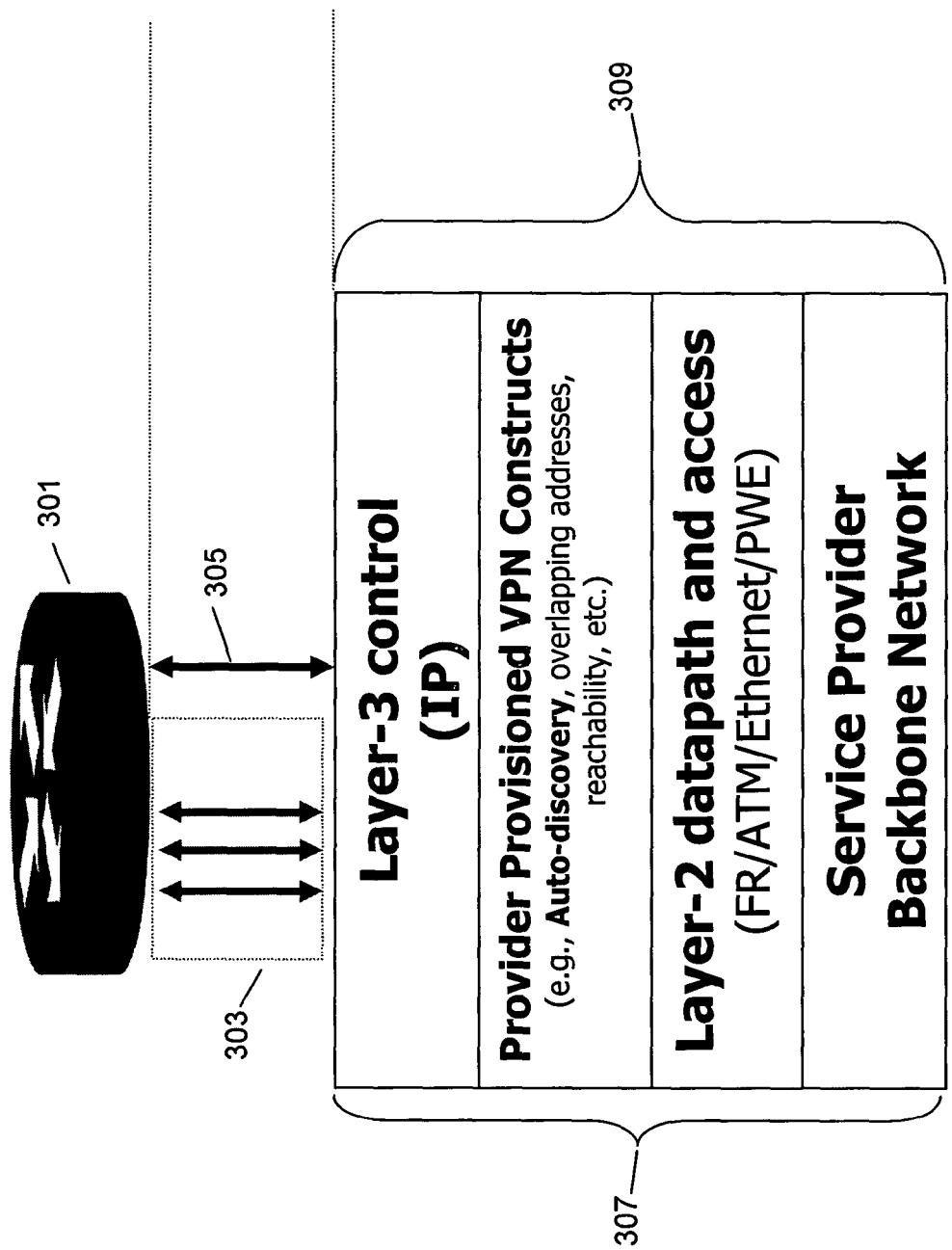
FIG. 3 is a diagram of the relation between Layer-2 datapath and network services provisioned by the service provider according to an embodiment of the invention.

Referring to FIG. 3, there is depicted a representation of the relationship between a Customer Edge device 301 (CE), typically a router; the Layer-2 datapath 303; the private routes 305 defined separately from the datapath; the service provider network 307; and the provider provisioned Layer-2.5 VPN architecture layers 309.

Figure 4:
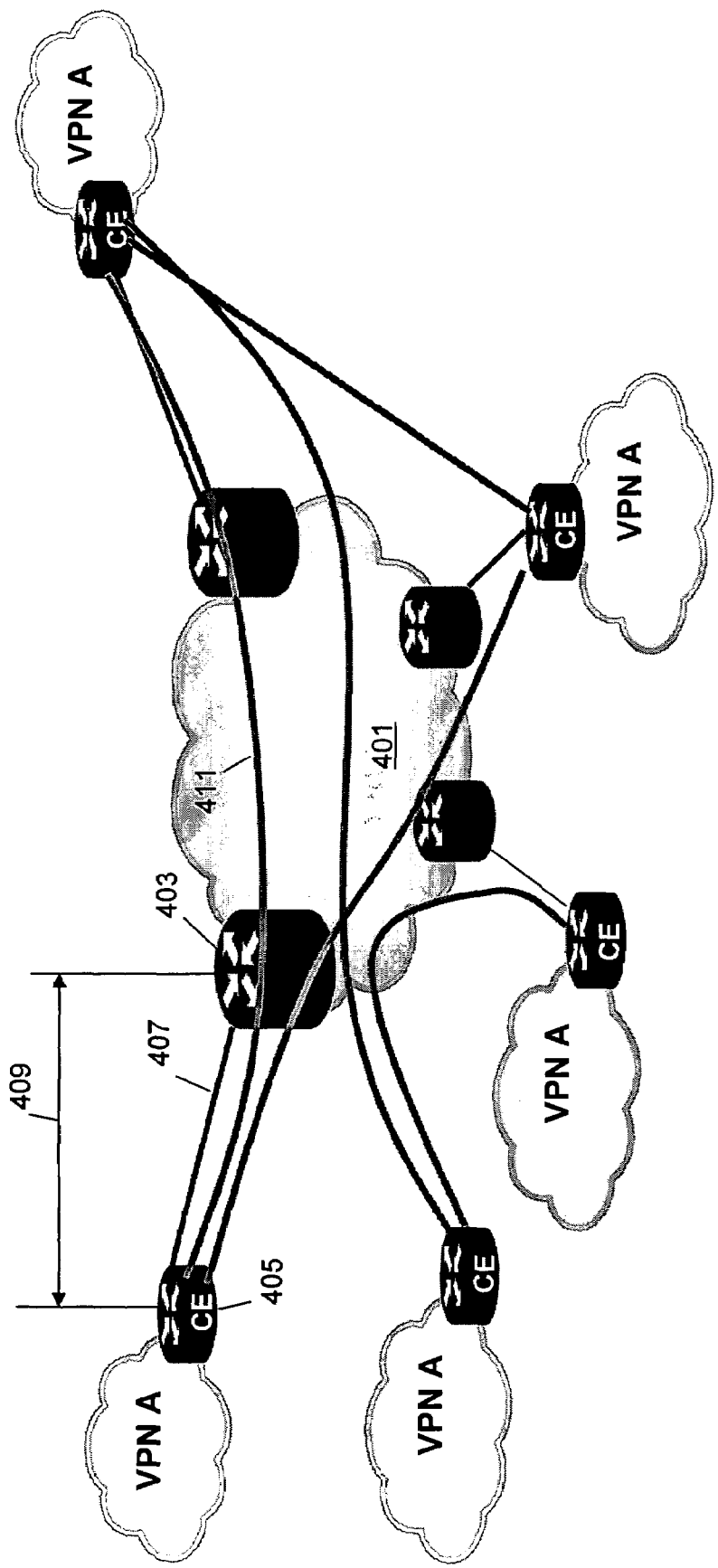
FIG. 4 is a diagram of a L2.5VPN network according to an embodiment of the invention.

Referring to FIG. 4 a L2.5VPN may be seen having a provider network with backbone 401, and provider edge device 403 (PE). A customer edge device 405 (CE) connects via Layer-2/Layer-3 access 407 to the provider edge device 403. Between edge devices 403 and 405 run services 409 consisting of OSPF/RIP/BGP, and/or MPLS signalling for L2VPN. The Layer-2 Virtual circuit 411 connects remote sections of VPN A through the provider network. The reachability distribution is Layer-3 VPNs, and the datapath is Layer-2 VPNs. With L2.5VPNs with traffic engineering (L2.5VPN-TE), the CE 405 will form a forwarding adjacency out of that Switched Virtual Circuit (SVC) by advertising the SVC as a TE link into the same instance of ISIS/OSPF. The SVC-L2VPN circuit can appear as an MPLS LSP to the CE 405 if the CE 405 is running MPLS.

The use of L2.5VPN provides for simplified provisioning in that:

Addition of a new port to a given SVC-L2.5VPN involves configuration and/or provisioning changes only on the PE that has this port;

BGP is used to distribute this information to other PEs that have ports of that SVC-L2VPN;

BGP is used to distribute this information to other CEs that have ports of that SVC-L2VPN;

the customer could establish or terminate a Layer-2 connection between a pair of ports in its SVC-L2VPN without involving configuration or provisioning changes in any of the service provider equipment by using (G)MPLS signalling; and the customer establishes a Layer-3 peering only with the attached PE.

Figure 5:
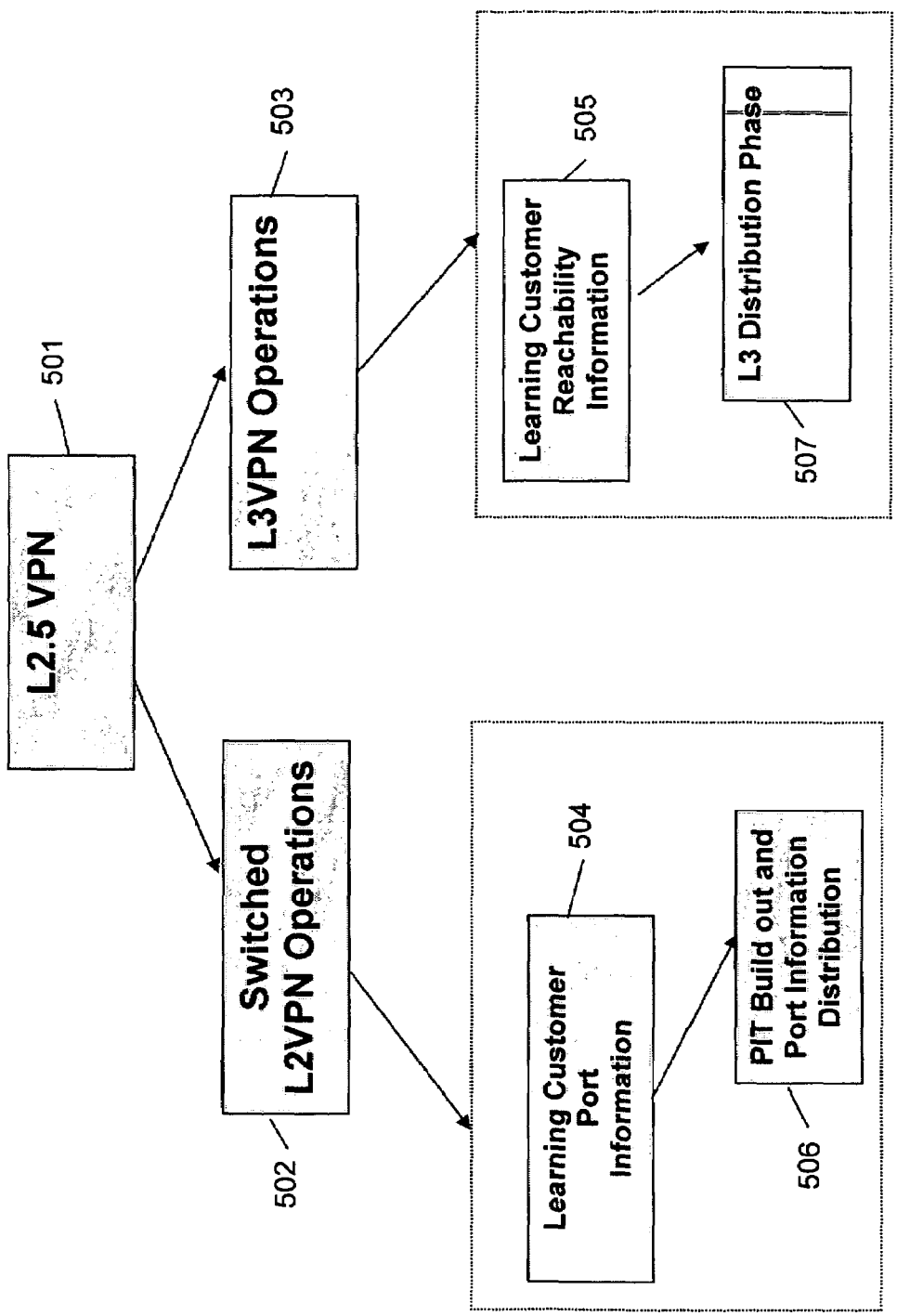
FIG. 5 is a block diagram of SVC-L2.5VPN mechanisms according to an embodiment of the invention.

The SVC-L2.5VPN mechanisms are illustrated in FIG. 5 where the L2.5VPN 501 has two distinct operations: the Switched L2VPN operations 502, and the Layer-3 VPN operations 503. Subsumed under the Switched L2VPN operations 502 are the learning customer port information 504 and Port Information Table build out and Port Information distribution 506. Subsumed under the Layer-3 VPN operations 503 are the learning customer reachability information function 505 and the Layer-3 distribution phase function 507. Switched L2VPN Operations 502 can offer offline Traffic Engineering as an option. Switched L2VPN Operations 502 can also be accomplished by using GMPS based optical VPNs. Layer-3 VPN operations 503 are only for online Traffic Engineering, which is accomplished by Layer-3 VPNs mechanisms.

Figure 6:
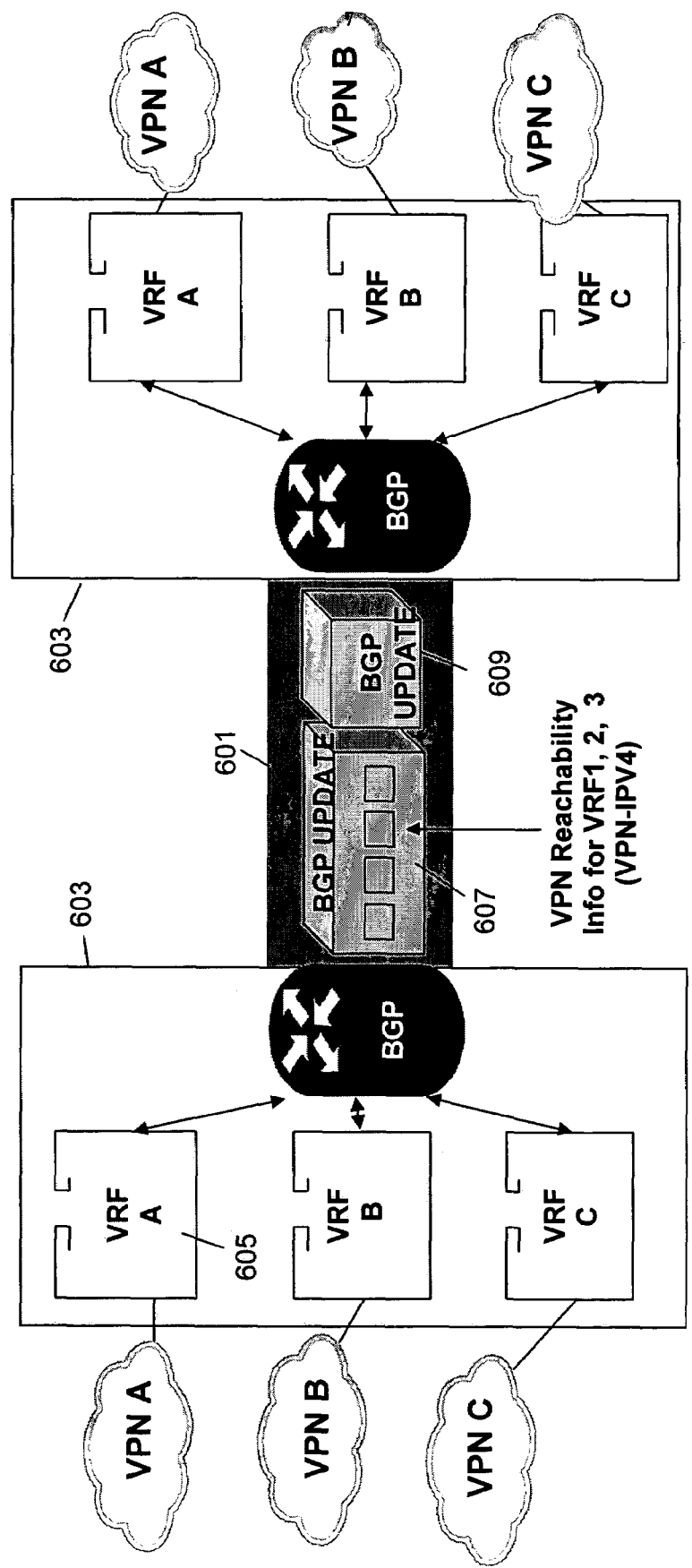
FIG. 6 is a diagram of a L2.5VPN network depicting one version of Layer-3 reachability distribution according to an embodiment of the invention.

Referring to FIG. 6, there is a depiction of a L2.5VPN with a reachability distribution scheme consisting of BGP updates through the backbone BGP. The backbone 601 connects a pair of Provider Edge devices 603, typically routers. A Virtual Router 605 connects to VPN A, while VPN Reachability Information 607 traverses backbone 601 via BGP updates 609. This is an illustration of the first of the Layer-3 reachability distribution methods.

Figure 7:
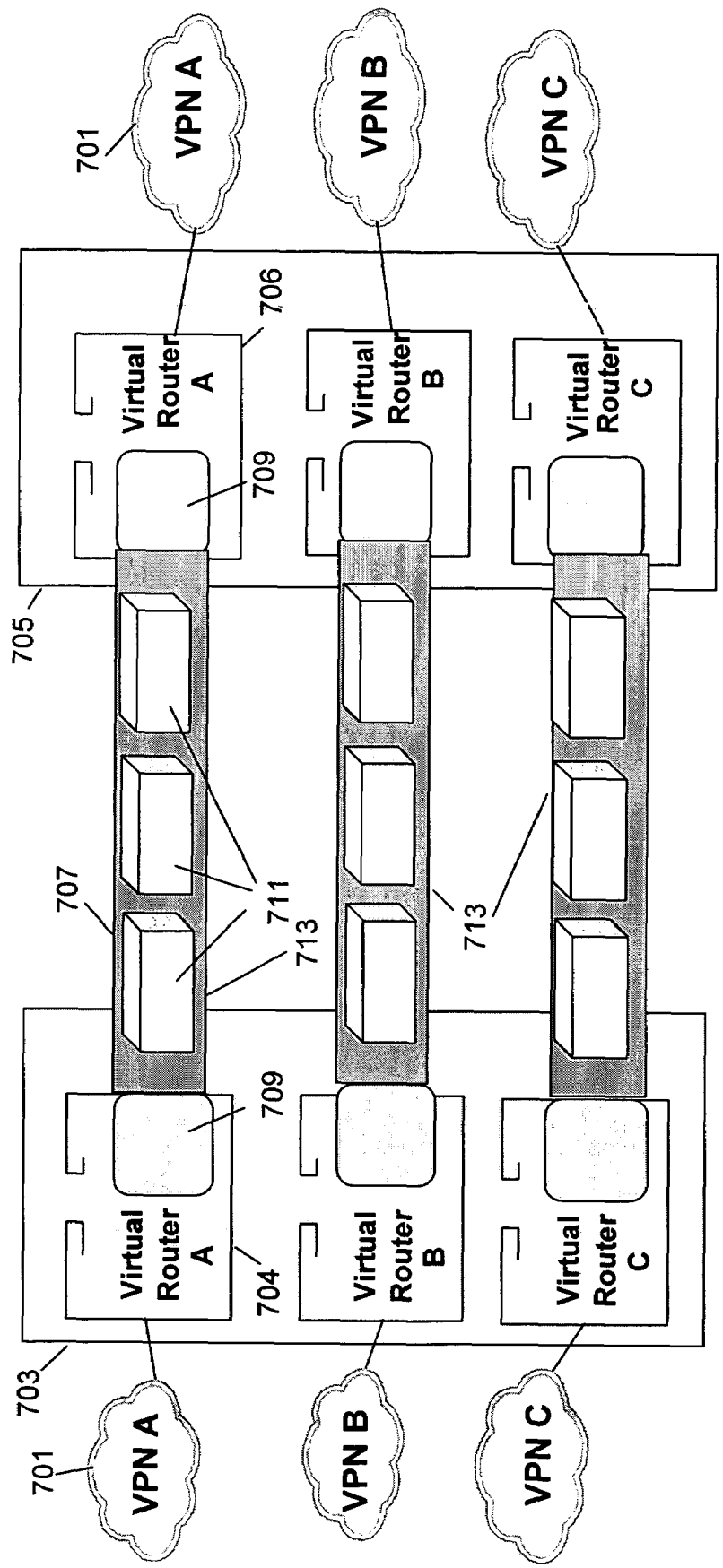
FIG. 7 is a diagram of a L2.5VPN network depicting another version of Layer-3 reachability distribution according to an alternative embodiment of the invention.

By way of contrast, FIG. 7 illustrates a L2.5VPN with a Virtual Router reachability distribution. VPN A 701 connects to Provider Edge device 703, typically a router, which connects across the provider network to a second Provider Edge device 705. Virtual Routers 704 and 706 provide the virtual routing mechanism within the Provider Edge devices. Item 709 represents a routing instance, and items 711 show routing updates providing per VPN reachability information along tunnels 707 which run along the backbones 713 of the provider network. This is an illustration of the second of the alternate Layer-3 reachability distribution methods.

While the invention has been described in conjunction with specific embodiments thereof, it is evident that many alternatives, modifications, and variations will be apparent to those skilled in the art in light of the foregoing description. Accordingly, it is intended to embrace all modifications, variations and adaptations such as may be made to the particular embodiments of the invention described above without departing from the scope of the invention, which is defined in the claims.

What is claimed is:

1. A network for providing switched virtual circuit Layer-2.5 VPNs, said network comprising:

a set of elements interconnected by services;

at least one first subset of elements defining a private network;

at least one second subset of elements different from said first subset defining a provider network wherein at least two subgroups of said first subset of elements may be connected via said provider network, said second subset of elements implementing a Layer-3 VPN service;

a provisioning mechanism used to define element membership in said first subset of elements;

a plurality of customer ports maintained on said elements of said first subset of elements;

a plurality of provider ports maintained on said second set of elements, each of said plurality of provider ports connected by services to a customer port, where said services allow said elements of said first subset of elements to establish Layer-3 peering with said second set of elements to exchange routing information;

a port information table stored in a computer storage device at each element of said provider network having a provider port among said plurality of provider ports, said port information table containing mapping information relating addresses of said customer ports to addresses of said provider ports for said first subset of elements;

a signalling mechanism used to create Layer-2 connectivity between elements within said first subset of elements at Layer-2 level across said Layer-3 VPN service implemented by said second subset of elements; and a reachability distribution mechanism such that a Layer-2 VPN may be provided across said Layer-3 VPN service.

2. A network for providing switched virtual circuit Layer-2.5 VPNs as claimed in claim 1, wherein said reachability distribution mechanism uses said Layer-3 VPN service.

3. A network for providing switched virtual circuit Layer-2.5 VPNs as claimed in claim 2, wherein said Layer-3 VPN service piggybacks VPN routes onto the backbone Border Gateway Protocol.

4. A network for providing switched virtual circuit Layer-2.5 VPNs as claimed in claim 2, wherein said Layer-3 VPN service uses a virtual router redistribution scheme.

5. A network for providing switched virtual circuit Layer-2.5 VPNs as claimed in claim 1, wherein said signalling mechanism is an MPLS signalling mechanism.

6. A network for providing switched virtual circuit Layer-2.5 VPNs as claimed in claim 1, further comprising an auto-discovery mechanism for distributing said mapping information to port information tables of said provider network.

7. A network for providing switched virtual circuit Layer-2.5 VPNs as claimed in claim 6, wherein said auto-discovery mechanism for distributing said mapping information uses Border Gateway Protocol.

8. A network for providing switched virtual circuit Layer-2.5 VPNs as claimed in claim 1, wherein said provisioning mechanism operates in conjunction with said signalling mechanism to restrict element connectivity to elements of said first subset.

9. A network for providing switched virtual circuit Layer-2.5 VPNs as claimed in claim 1, wherein said data and signalling services have IP signalling services.

10. A network for providing switched virtual circuit Layer-2.5 VPNs as claimed in claim 1, wherein said customer port addresses need be unique only within said first subset of elements.

11. A network for providing switched virtual circuit Layer-2.5 VPNs as claimed in claim 1, wherein said customer port addresses and provider port addresses use an addressing scheme chosen from the group of Ipv4, Ipv6, and NSAP.

12. A method of organizing a network having a set of elements interconnected by services, wherein at least one first subset of elements defines a private network and at least one second subset of elements different from said first subset defines a provider network implementing a Layer-3 VPN service and wherein at least two subgroups of said first subset of elements may be connected via said provider network, said method comprising:

defining element membership in said first subset of elements via a provisioning mechanism;

establishing a plurality of customer ports within said elements of said first subset of elements;

establishing a plurality of provider ports within said second set of elements, each of said plurality of provider ports connected by services to a customer port, where said services allow said elements of said first subset of elements to establish Layer-3 peering with said second set of elements to exchange routing information;

establishing a port information table at each element of said provider network having a provider port among said plurality of provider ports, said port information table containing mapping information relating addresses of said customer ports to addresses of said provider ports;

determining reachability across said second subset of elements; and creating Layer-2 connectivity within said first subset of elements at Layer-2 level across said Layer-3 VPN service implemented by said second subset of elements via a signalling mechanism;

thereby allowing provision of a Layer-2 VPN across said Layer-3 VPN service while allowing provision of Layer-3 services.

13. The method of claim 12 wherein said reachability is determined via said Layer-3 VPN service.

14. The method of claim 13 wherein said Layer-3 VPN service piggybacks VPN routes onto the backbone Border Gateway Protocol.

15. The method of claim 13 wherein said Layer-3 VPN service uses a virtual router redistribution scheme.

16. The method of claim 12, further comprising distributing said mapping information to port information tables of said provider network via an auto-discovery mechanism.

17. The method of claim 16, wherein said auto-discovery mechanism for distributing said mapping information uses Border Gateway Protocol.

18. The method of claim 12 further comprising restricting element connectivity to elements of said first subset via said provisioning mechanism operating in conjunction with said signalling mechanism.

19. The method of claim 12 wherein said signalling mechanism is an MPLS signalling mechanism.

20. The method of claim 12 wherein said data and signalling services have P signalling services.

21. The method of claim 12 wherein said customer port addresses need be unique only within said first subset of elements.

22. The method of claim 12 wherein said customer port addresses and provider port addresses use an addressing scheme chosen from the group of Ipv4, Ipv6, and NSAP.

23. A method of organizing a network having a set of elements interconnected by services, wherein at least one first subset of elements defines a private network and at least one second subset of elements different from said first subset defines a provider network and wherein at least two subgroups of said first subset of elements may be connected via said provider network, said method comprising:

defining a Layer-2 VPN topology;

establishing a plurality of customer ports within said elements of said first subset of elements;

establishing a plurality of provider ports within said second set of elements, each of said plurality of provider ports connected by data and signalling services to a customer port, where said data and signalling services allow said elements of said first subset of elements to establish Layer-3 peering with said second set of elements to exchange routing information;

creating a Layer-2 Port Information Table for each provider port;

establishing identity of said customer ports attached to each provider port among said plurality of provider ports, and populating the Layer-2 Port Information Table at said each provider port with mapping information relating addresses of said customer ports to addresses of said provider ports;

distributing said mapping information to Layer-2 Port Information Tables of said provider network via an auto-discovery mechanism;

determining reachability across said second subset of elements via a Layer-3 VPN service; and creating Layer-2 connectivity within said first subset of elements at Layer-2 level across said Layen-3 VPN service implemented by said second subset of elements via a signalling mechanism upon request from an element within said first subset of elements;

thereby allowing provision of a Layer-2 VPN across said Layer-3 VPN service while allowing provision of Layer-3 services.

* * * * *